Figures 1, 2:
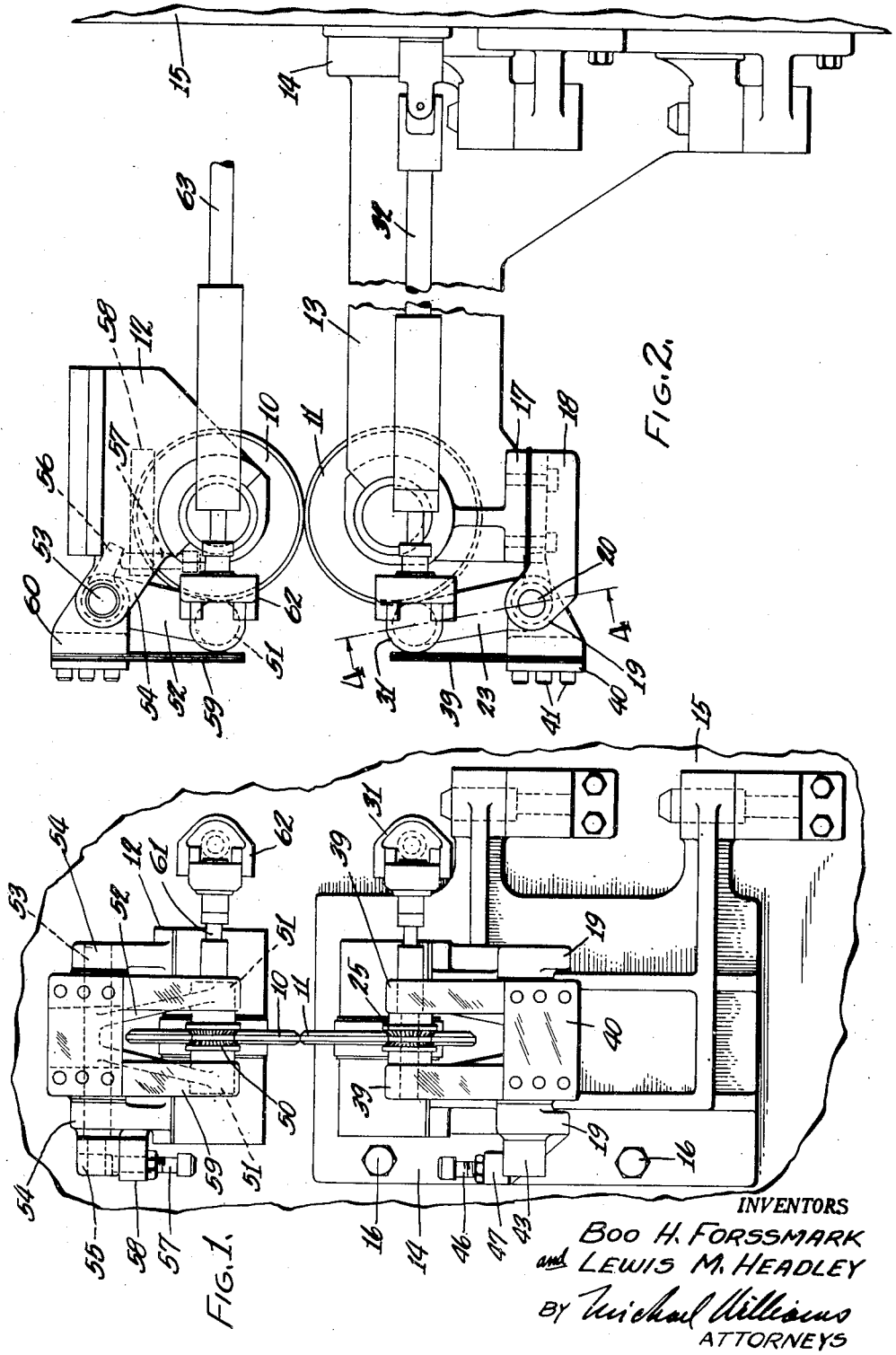

Nov. 1, 1949.  B. H. FORSSMARK ET AL  2,486,592
WELDING MACHINE

Filed April 1, 1947  2 Sheets-Sheet 1

INVENTORS
Boo H. Forssmark
and Lewis M. Headley
BY Michael Williams
ATTORNEYS

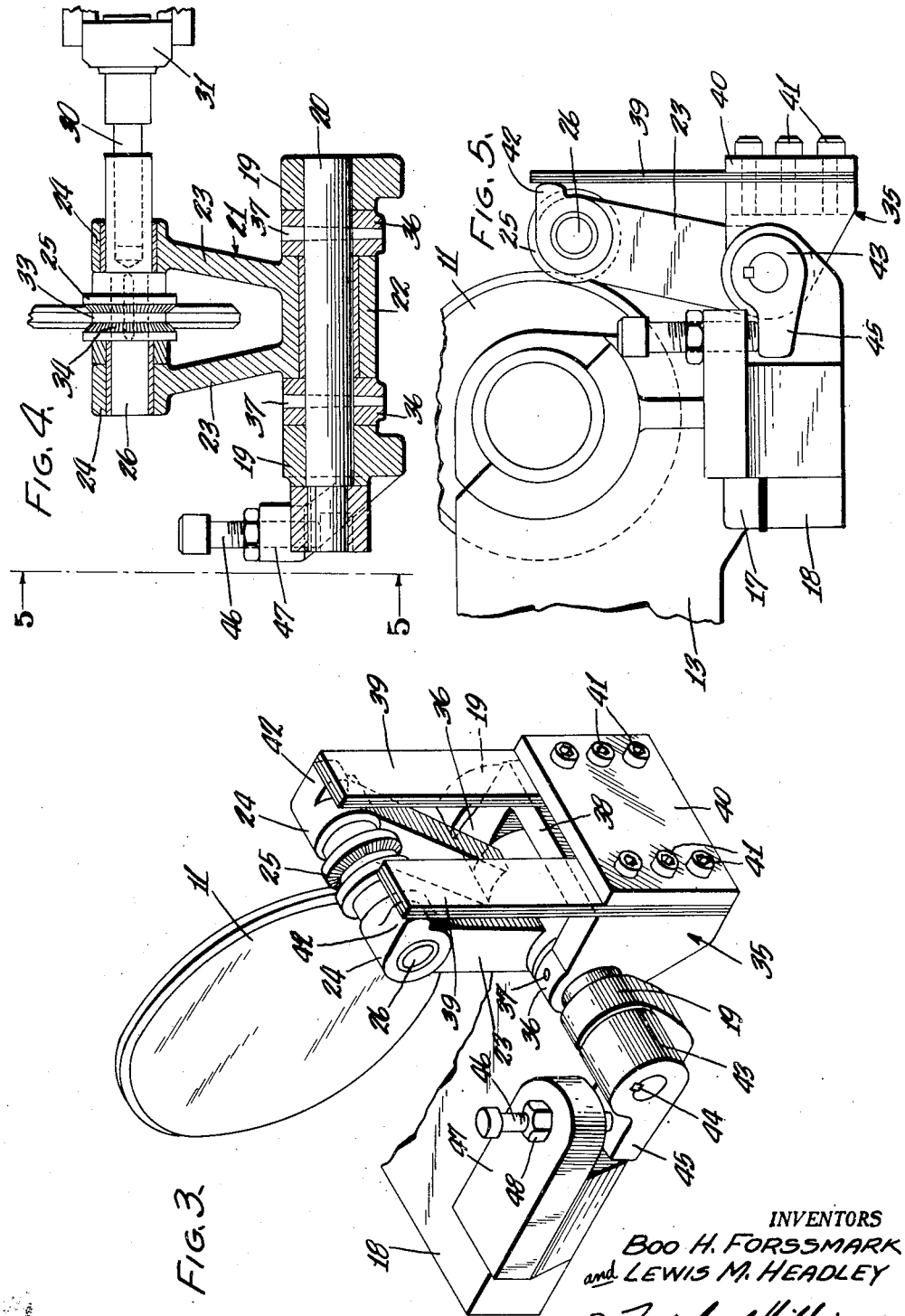

Patented Nov. 1, 1949

2,486,592

UNITED STATES PATENT OFFICE 2,486,592

WELDING MACHINE

Boo H. Forssmark and Lewis M. Headley, Warren, Ohio, assignors to The Federal Machine and Welder Company, Warren, Ohio, a corporation of Ohio Application April 1, 1947, Serial No. 738,532

7 Claims. (Cl. 219—4)

Our invention relates to welding machines, particularly to electric resistance seam welding machines, and the principal object of our invention is to provide new and improved machines of the character described.

In the drawings accompanying this specification and forming part of this application, there is shown, for purposes of illustration, an embodiment which our invention may assume, and in these drawings:

Figure 1 is a fragmentary end elevational view of a seam welding machine illustrating an embodiment of our invention, Figure 2 is a fragmentary side elevational view of the embodiment shown in Figure 1, Figure 3 is an enlarged fragmentary perspective view illustrating constructional details, Figure 4 is an enlarged fragmentary sectional view corresponding generally to the line 4—4 of Figure 2, and Figure 5 is a fragmentary side elevational view indicated by the line 5—5 of Figure 4.

Our invention is particularly adapted for use in connection with an electric resistance seam welding machine, and accordingly it is shown and described in such connection. Referring particularly to Figures 1 and 2, the seam welding machine herein shown to disclose the invention comprises weld wheels 10, 11 which are usually formed of copper or copper alloys so as to possess good current carrying characteristics.

The wheel 10, which in this case may be termed the upper weld wheel, is journalled in an upper welding head 12 which is usually movable in a vertical direction in any suitable manner. The upper welding head 12 is preferably formed of copper or copper alloy so that it may be connected to one side of the secondary of the welding transformer (not shown) in any desired manner, current passing through the journal provided by the head 12 to the weld wheel 10.

The weld wheel 11, which in this case may be termed the lower weld wheel, is journalled in a lower arm 13, of any desired construction, which also is preferably formed of copper or copper alloy so that it may be connected to the other side of the transformer secondary to provide for flow of current through its journal to the weld wheel 11. In usual practice, the lower arm is stationary, so that the upper weld wheel 10, through movement of the head 12, may be caused to move toward or away from the lower weld wheel 11.

In the particular construction illustrated, the lower arm 13 is carried by a plate 14 which is pivotally supported by the frame 15 of the machine. This construction enables the lower arm 13 and its weld wheel 11 to be swung out from under the weld wheel 10, when bolts 16 are removed.

The lower arm 13 is formed with a support portion 17 to which is bolted a supporting plate 18. The plate 18 provides a pair of spaced-apart ears 19 which support a rock shaft 20. Freely journalled upon the rock shaft 20 is a bracket 21 comprising a bearing portion 22 and a pair of arms 23 extending in diverging relation from the bearing portion 22 and terminating in spaced-apart bearings 24.

A knurl wheel 25 is disposed between the bearings 24, and is carried by a shaft 26 journalled in the bearings. In this particular case, the knurl wheel 25 not only maintains the contour of the peripheral surface of the weld wheel 11, but also drives this weld wheel, and for this purpose, the shaft 26 is connected to a stud shaft 30 extending from a universal gear joint 31 which is driven by a shaft 32 from any suitable source of power (not shown). As best seen in Figures 3 and 4, the knurl wheel 25 is formed with the usual groove 33 to receive the peripheral surface of the weld wheel 11, the groove having fluted surfaces 34 which maintain the contour of the weld wheel 11, and also assist in driving such wheel.

A bracket 35 is also carried by the rock shaft 20, this bracket comprising a pair of spaced-apart ears 36, each having an aperture passing the rock shaft 20. As best seen in Figure 4, the ears 36 are fixed to move with the rock shaft by means of pins 37. The bracket 35 also comprises a bridge portion 38 joining the ears 36.

From the foregoing description, it will be clear that the knurl wheel 25 is mounted for movement toward and away from the weld wheel 11. Our invention further provides resilient means for urging the knurl wheel 25 in a direction toward the peripheral surface of the weld wheel 11, and as herein disclosed, the resilient means comprises leaf spring means for this purpose.

In the embodiment illustrating the invention, the leaf spring means takes the form of a pair of leaf springs 39, each formed of one or more spring leaves. The leaf springs 39 are held in position by means of a plate 40 which preferably spans both leaf springs. The plate 40 and leaf springs 39 are provided with aligned apertures for passing bolts 41 which are threaded in recesses formed in the bridge portion 38 of the bracket 35. The free ends of the leaf springs abut against respective ones of the spaced-apart bearings 24, and to facilitate such inter-abutment, each of the bearings 24 is provided with a foot 42, as best seen in Figure 3.

To provide for adjustment of the urging force of the leaf springs 39, a dog 43 is fixed to rotate with the rock shaft 20, preferably by means of a key 44, the extending foot 45 of the dog 43 being positioned for cooperation with an adjusting screw 46 which is threaded through a lug 47 extending from the supporting plate 18.

To increase urging force of the leaf springs 39, the adjusting screw 46 is turned so that it moves in a direction toward the foot 45, so as to move the dog 43 and rock shaft 20 in a counter-clockwise direction, referring to Figures 3 and 5, and therefore likewise moving the bracket 35 in such direction and causing the free ends of the leaf springs 39 to bear against the feet 42 with greater force. A lock nut 48 is provided to hold the screw 46 in any adjusted position.

Deflection properties of the leaf springs may be varied to suit the requirements of the welding machine, merely by changing the leaves of the springs. Thus, one or more leaves may be used, or leaves of different thicknesses may be substituted, to provide the stiffness required. The adjusting provisions provided by the adjusting screw 46 and related parts regulate the urging force of the leaf springs and insure that proper urging force will be exerted upon the knurl wheel 25 as the weld wheel wears and reduces in diameter.

In the particular embodiment of the invention herein disclosed, the upper weld wheel 10 is also knurl driven, and in this respect, mechanism similar to that described in connection with the lower weld wheel 11 is provided.

Referring to Figures 1 and 2, a shaft carrying a knurl wheel 50 is journalled in spaced-apart bearings 51 provided in the ends of arms 52 of a bracket journalled on a rock shaft 53. The rock shaft is carried in spaced-apart ears 54 extending from the upper welding head 12. A dog 55 is fixed to the rock shaft 53 and is provided with a foot 56 positioned to cooperate with an adjusting screw 57 threaded through a lug 58 carried by welding head 12. Leaf spring means 59 are carried by a bracket 60 which is fixed to rotate with the rock shaft 53. The operation of this construction is substantially similar to that previously described. The shaft of the knurl wheel 50 is connected to a stub shaft 61 leading from a universal gear joint 62, and is driven by a shaft 63 which is connected to any suitable source of power.

From the foregoing, it will be appreciated by those skilled in the art that we have accomplished at least the principal object of our invention, and it also will be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that our invention is not limited thereto.

We claim:

1. In combination: a revolvable member; means for maintaining the contour of said revolvable member, mounted for movement toward or away from said member; and leaf spring means comprising one or more leaves, for urging said contour maintaining means in a direction toward said member.

2. In an electric resistance seam welder: a weld wheel; a knurl wheel engageable with said weld wheel at its peripheral surface; means supporting said knurl wheel for movement toward or away from said peripheral surface; and leaf spring means, for urging said knurl wheel in a direction toward said peripheral surface.

3. In an electric resistance seam welder: a weld wheel; a knurl wheel engageable with said weld wheel at its peripheral surface; a support; bracket means carried by said support, and providing a journal for said knurl wheel, said bracket means being movable so that said knurl wheel may be moved toward or away from said peripheral surface; and leaf spring means carried by said support and bearing against said bracket means for urging said knurl wheel in a direction toward said peripheral surface.

4. In an electric resistance seam welder: a weld wheel; a knurl wheel engageable with said weld wheel at its peripheral surface; a support; first bracket means pivotally carried by said support, and having bearing means for journalling said knurl wheel; second bracket means pivotally carried by said support; and leaf spring means carried by said second bracket means and abutting said bearing means for urging said knurl wheel in a direction toward said peripheral surface.

5. In an electric resistance seam welder: a weld wheel; a knurl wheel engageable with said weld wheel at its peripheral surface; a support; a rock shaft journalled on said support; first bracket means journalled on said rock shaft, and having bearing means for journalling said knurl wheel; second bracket means carried by said rock shaft for rocking movement therewith; leaf spring means having one end secured to said second bracket means, said leaf spring means abutting said bearing means for urging said knurl wheel in a direction toward said peripheral surface; and means for effecting movement of said rock shaft, providing for adjustment of the urging force of said leaf spring means.

6. In an electric resistance seam welder: a weld wheel; a knurl wheel engageable with said weld wheel at its peripheral surface; a support; a rock shaft journalled on said support; first bracket means journalled on said rock shaft, and having spaced-apart bearings between which said knurl wheel is journalled; second bracket means carried by said rock shaft for rocking movement therewith; a pair of leaf spring means carried in spaced-apart relation by said second bracket means, said leaf spring means abutting respective ones of said spaced-apart bearings for urging said knurl wheel in a direction toward said peripheral surface; dog means movable with said rock shaft; and adjusting screw means, bearing against said dog means, for effecting adjustment of the urging force of said leaf spring means.

7. In an electric resistance seam welder: a weld wheel; a knurl wheel engageable with said weld wheel at its peripheral surface, and movable toward and away from said peripheral surface; and a leaf spring construction, for urging said knurl wheel in a direction toward said peripheral surface, comprising means whereby one or more spring leaves may be used to provide the urging force.

BOO H. FORSSMARK.
LEWIS M. HEADLEY.

REFERENCES CITED

The following references are of record in the file of this patent:

UNITED STATES PATENTS

| Number | Name | Date |
|---|---|---|
| 1,079,073 | Swanson et al. | Nov. 18, 1913 |
| 1,822,371 | Pioch et al. | Sept. 8, 1931 |
| 1,862,108 | Brueckner | June 7, 1932 |

FOREIGN PATENTS

| Number | Country | Date |
|---|---|---|
| 310,822 | Italy | Sept. 8, 1933 |